C. WHEALEN & L. KNERR, Jr.
Machinery for Drying Straw Boards, &c.
No. 211,485. Patented Jan. 21, 1879.
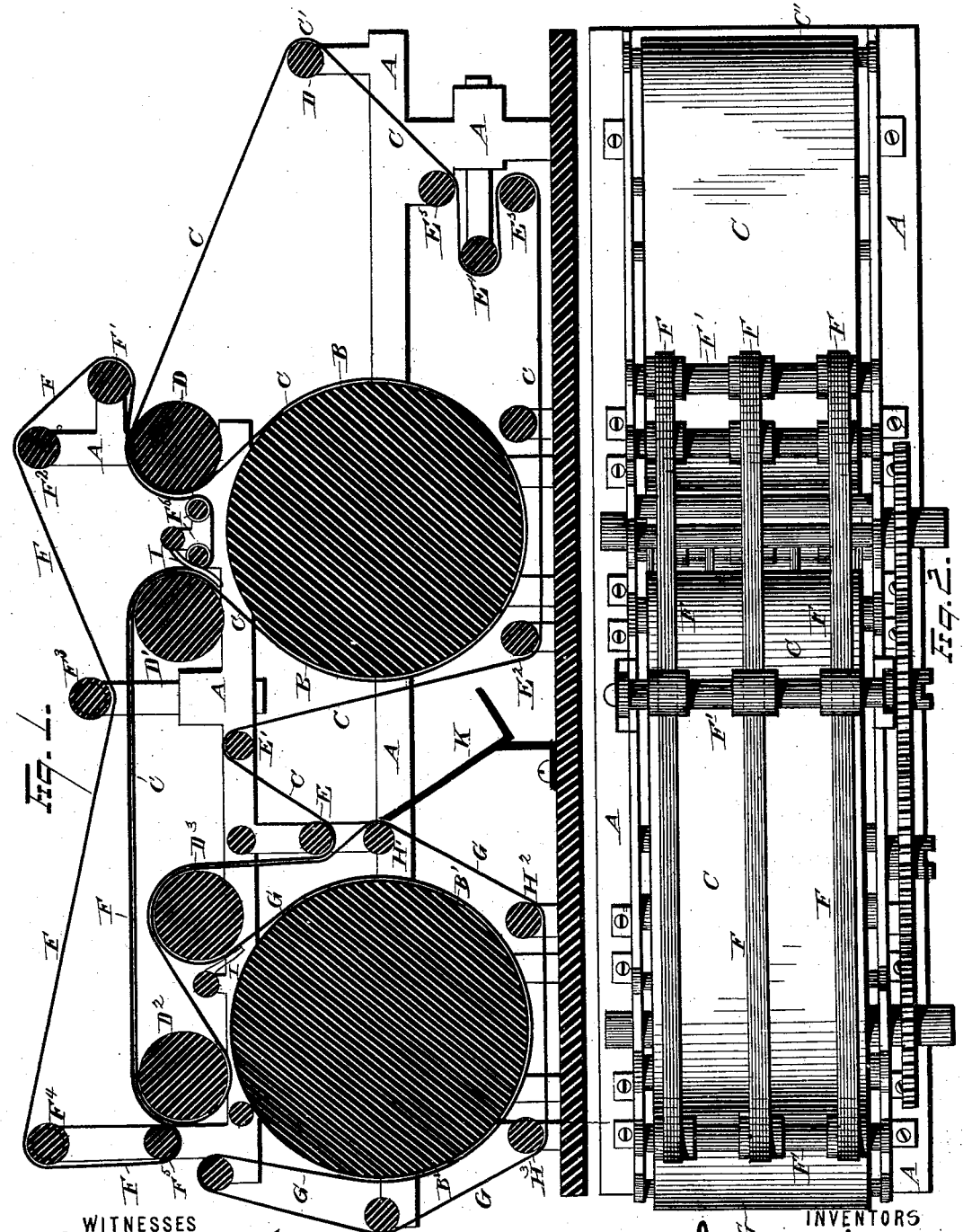

UNITED STATES PATENT OFFICE.

CHARLES WHEALEN AND LEWIS KNERR, JR., OF DAYTON, OHIO.

IMPROVEMENT IN MACHINERY FOR DRYING STRAW-BOARDS, &c.

Specification forming part of Letters Patent No. 211,485, dated January 21, 1879; application filed November 5, 1878.

*To all whom it may concern:*

Be it known that we, CHARLES WHEALEN and LEWIS KNERR, Jr., of Dayton, in the county of Montgomery and State of Ohio, have invented certain new and useful Improvements in Machinery for Drying Straw-Boards; and we do hereby declare the following to be a full, clear, and exact description of the invention, such as will enable others skilled in the art to which it pertains to make and use it, reference being had to the accompanying drawings, which form part of this specification.

Our invention relates to new and useful improvements in the process of making paper boards, and in machinery for carrying the said process into effect, and is intended as an improvement in the process and machinery patented by us May 14, 1878, No. 203,684.

It consists in the combination, with a heated surface and belting capable of conveying said boards in direct contact with the same, of a second heated surface and belting capable of conveying said boards in direct contact therewith, the same being adapted to cause that side of the boards which was not acted upon by the first heated surface to be acted upon by said second heated surface.

The invention consists, secondly, in the combination, with suitable heating-drums, of three endless belts or systems of belts, the first one adapted to convey the boards in contact with one of the drums, the second adapted, in connection with the first, to carry the boards forward and deliver them to the third, while said third belt is adapted to cause the face or side of the boards opposite to that acted upon by said first drum to be subjected to the second drum.

In the drawings, Figure 1 represents a longitudinal central section of machine embodying the principles of our invention. Fig. 2 is a plan view of the same.

A is a suitable frame. B and B' are heating cylinders or rolls, so geared with each other in the instance shown as to run in opposite directions, though this is not material, and depends entirely upon the arrangement of the belts or other appliances for feeding and holding the board in contact with the heated surfaces.

C is a belt or apron, adapted at any suitable point, as C', to receive in succession the separate paper boards as they are fed to the machine. This continuous belt C, in the instance shown, passes over a guide-roller, D, thence down around the heating drum or cylinder B, thence over $D^1$, $D^2$, and $D^3$, and back around E, $E^1$, $E^2$, $E^3$, $E^4$, and $E^5$ to the place of beginning.

F is a retaining belt or apron; or, as shown in Fig. 2, it may consist of a number of small belts arranged side by side. Its purpose is to hold the paper-board in contact with the apron C while the said apron is conveying the board from one heated drum or cylinder to another.

G is another belt or apron, which passes around the drum B', thence over the roller $D^2$, and down around guide-rollers $H^1$, $H^2$, and $H^3$ back to the place of beginning.

I represents strippers, which strip the boards from the heating-drums and direct their edges up between the belts or aprons. K represents a suitable receiver, upon which the dried boards are delivered from the machine.

It will be noticed that the apron or belts F pass about guide-rollers D $F^1$ $F^2$, beneath $F^3$, about $F^4$ $F^5$, over $D^2$ and $D^1$, then beneath rollers $F^6$ to the place of beginning.

The operation of this device is as follows: The boards, as they are received from the press or elsewhere in condition to be dried, are fed successively upon the apron C at C'. The apron, moving forward, carries the board between the belts C and F on the guide-roller D. The board is then directed down upon the heating drum or cylinder B, and is held in contact with that surface by the apron C until its edge comes in contact with the first stripper I. This stripper directs the edge of the board up between the belts C and F on the roller $D^1$. The board is then conveyed forward to the guide-roller $D^2$. As it passes over this last roller it is directed downward, and is dropped from the apron C down upon the heating-drum B', and is held in contact therewith by the belt G; but it will be observed that it presents the other surface to this heating-cylinder, and not the same surface that was presented to the cylinder B. It passes around the cylinder B' until it reaches the second stripper I. This directs its edge up between the belts C and G on the roller $D^3$, and it is conveyed by these two belts until it is delivered from between them into the receiver K. It will then be found to be uniformly dried, and will have been acted upon by the drying cylinders or surfaces upon both of its faces. The sheets will be smooth and straight, and the whole will be accomplished without any waste.

We do not limit ourselves to any particular number of heating-drums, nor to an equal number of drums for each face of the paper. We prefer, however, that there should be about the same amount of exposure to heating surfaces for each of the two faces of the paper. So, also, the drums may be maintained at like temperature, or the temperature of the different drums may be varied.

It is also not absolutely essential, though preferable, that the boards should be delivered in flat condition, for there are circumstances under which it is apparent that they should have curved forms when delivered, and which may obviously be accomplished by causing them to be delivered from between the belts just as it has passed over a suitable guide-roller.

The drums may be heated in any suitable manner, but preferably by steam or hot air or fluid entering and passing out at the axle, an example of which is shown in our former patent alluded to.

We are aware that it is not new with us to provide an apparatus capable of subjecting opposite sides or faces of the boards to the drying action of suitable rollers, and hence we do not lay claim to the same.

What we claim is—

1. A paper-drier consisting in the combination, with a heated surface and belting capable of conveying the boards in direct contact with the same, of a second heated surface and belting capable of conveying said boards in direct contact therewith, the same being adapted to cause that side of the boards which was not acted upon by the first heated surface to be acted upon by said second heated surface, substantially as set forth.

2. In a paper-drier, the combination, with the heating-drums, of three endless belts or systems of belts, said first belt adapted to convey the boards in contact with one of the drums, said second belt adapted, in connection with the first, to carry the boards forward and deliver them to the third belt, while said third belt is adapted to cause the face or side of the boards opposite to that acted upon by said first drum to be subjected to the second drum, substantially as set forth.

In testimony whereof we have signed our names to this specification in the presence of two subscribing witnesses.

CHARLES WHEALEN.
LEWIS KNERR, JR.

Witnesses:
EDWIN L. SHUEY,
JOHN A. SHANCK.